United States Patent [19]

Dosjoub

[11] Patent Number: 5,054,315
[45] Date of Patent: Oct. 8, 1991

[54] CODING OF THE VALUE OF SEVERAL QUANTITIES MEASURED IN A TIRE

[75] Inventor: Andre Dosjoub, Chamalieres, France

[73] Assignee: Compagnie Generale des Etablissements Michelin-Michelin & CIE, Clermont-Ferrand, France

[21] Appl. No.: 499,285
[22] PCT Filed: Dec. 14, 1988
[86] PCT No.: PCT/FR88/00613
§ 371 Date: Jul. 12, 1990
§ 102(e) Date: Jul. 12, 1990
[87] PCT Pub. No.: WO89/05738
PCT Pub. Date: Jun. 29, 1989

[30] Foreign Application Priority Data

Dec. 18, 1987 [FR] France .................. 87 17864

[51] Int. Cl.$^5$ .................................... B60C 23/04
[52] U.S. Cl. ...................... 73/146.5; 340/442; 374/143
[58] Field of Search ............. 73/146.5, 146.8; 374/143; 340/442, 445, 858, 859

[56] References Cited

U.S. PATENT DOCUMENTS

| 469,823 | 3/1892 | Hannan. | |
|---|---|---|---|
| 4,467,641 | 8/1984 | Abraham | 73/146.5 |
| 4,651,151 | 3/1987 | Combe et al. | 340/870.24 |
| 4,695,823 | 9/1987 | Vernon | 340/146.8 |
| 4,703,650 | 11/1987 | Dosjoub et al. | 73/146.5 |
| 4,749,993 | 6/1988 | Szabo et al. | 340/448 |
| 4,935,738 | 6/1990 | Pilato | 73/146.5 |

FOREIGN PATENT DOCUMENTS

| 0162990 | 12/1985 | European Pat. Off. |
| 2500926 | 9/1982 | France. |
| 2551556 | 3/1985 | France. |
| 2098430 | 11/1982 | United Kingdom. |
| 8700127 | 1/1987 | World Int. Prop. O. |

OTHER PUBLICATIONS

Patent Abstracts of Japan, vol. 8, No. 148 (M-308) (1585) Jul. 11, 1984, & JP, A, 5945204, Mar. 14, 1984.

*Primary Examiner*—Donald O. Woodiel
*Attorney, Agent, or Firm*—Oblon, Spivak, McClelland, Maier & Neustadt

[57] ABSTRACT

Coding of the value of any number of quantities measured in a tire, for example its pressure and its temperature, is carried out using a ratio of time intervals TP/Tr, Tt/Tr. This frees the device from the effect of the time shift of the modulation system, the time shift affecting simultaneously the numerator and the denominator of said ratio.

4 Claims, 3 Drawing Sheets

CODING OF THE VALUE OF SEVERAL QUANTITIES MEASURED IN A TIRE

BACKGROUND OF THE INVENTION

This invention relates to the devices for monitoring tires. More particularly, it relates to the coding making possible the transmission of the value of several quantities measured by means of a single transmission channel between the wheel carrying the tire, moving in rotation, and the frame or support element, not moving in rotation.

Description of Related Art

Patent application WO87/00127 proposes a coding type making possible the transmission of the pressure of the tire and of its temperature. The measurements of the quantities observed (pressure, temperature) are coded in time intervals.

The operation of most electronic devices is liable to drift over time, by the aging of the components, by the effect of the temperature on the operation of the latter, or by other disturbing influences. Standard precautions for combating these drifts generally increase the cost, the space requirement, the consumption of the circuits. Now, in this application, these defects are incompatible.

SUMMARY OF THE INVENTION

The object of the invention is to be free of these drifts not by eliminating them or by limiting them but by sending image data of the drift in addition to researched data, which makes it possible, after the event, to remove the effect of the drifts on this data.

In another object, the invention proposes a coding which makes it possible to transmit the value of any number of quantities observed on a wheel.

According to the invention, the device for coding the value of n quantities measured on a tire, making possible the transmission of said values to the frame carrying said tire, is characterized in that it comprises means making it possible to mark the start of the measuring cycle, a generator delivering a cyclical signal in ramp form, n means each sensitive to one of said quantities, each constantly delivering a signal as a function of the value of said quantity to which it is sensitive, an element delivering a reference value corresponding to the end of the measuring cycle, n+1 coincidence detectors receiving, at one of their two inputs, said signal in ramp form, and delivering a high signal when the signals at their two inputs are identical, and a low signal at any other time, said other input receiving for the first coincidence detector, the output value of one of the means sensitive to said quantities, for the last coincidence detector, said reference value for the remaining n−1 coincidence detectors, the output value of a summation device working out the sum of the value of the input of the preceding coincidence detector and the output value of one of n means sensitive to said quantities.

The measuring cycle begins by the start of the ramp signal. If it is assumed that the observed quantities are equivalent to $x_i$ (i varying from 1 to n), thanks to the coincidence detectors, each value $x_i$ will be coded by a time period $T_i$. The first coincidence detector will deliver a pulse to the end of time period $T_1$ coding value $x_1$ of the first quantity observed. By the use of a summation device, the second coincidence detector will deliver a pulse at the end of a time period $T_1+T_2$ (counted from the start of the ramp), $T_2$ coding value $x_2$ of the second quantity observed, and so on up to $T_n$ coding $x_n$. The reference value is selected so that the last detector delivers a pulse after a period $T_{n+1}$ which is, in the most unfavorable case, always greater than $T_i$. By the most unfavorable case, the case where all periods $T_i$ are the longest, taking into account the value of the observed quantities and the coding method, is meant. This last pulse also allows the start of a new measuring cycle, after a delay, if necessary.

Periods $T_i$ therefore are a function of values $x_i$ which it is desired to have, after decoding, aboard a vehicle. But they also are each a function of parasitic influences (aging, temperature, . . . ) because periods $T_i$ also depend on the slope of the ramp to which the various values are compared. Thanks to said reference element, the image of all the disturbances is given by $T_{n+1}$, making it possible to know the angle of the ramp. Each value $x_i$ is a function of the ratio of periods as follows: $X_i = f(—)$. Since each value is coded by a time interval ratio, the fluctuation of the latter has no influence if it is identical. Now, in such a coding circuit, the most critical point is the achievement of the ramp, and more particularly the capacitor setting the time constant making it possible to obtain this ramp. The aging, or in general, the drift of the capacitor will have the same influence on periods $T_i$ and on period $T_{n+1}$. Consequently, the precision of the measurement is preserved in spite of the drifts.

Whatever the number of observed quantities may be, it is sufficient for a reference value. In an analog embodiment, it is a reference voltage, and in a digital embodiment, it is the value of a counter, which can be made in an economical way. Also in a digital embodiment, the obtaining of a ramp calls upon an oscillator. A crystal, which is stable but costly, or else a circuit of type 555, whose period is regulated by the selection of a resistance and a capacitor, can be used. There again, the drift of the capacitor and/or the resistance has no effect on the precision of the measurements.

BRIEF DESCRIPTION OF THE DRAWINGS

The following figures illustrate an application of the invention to the measurement of the pressure and the temperature in a tire.

DESCRIPTION OF THE PREFERRED EMBODIMENT

Figure 1:
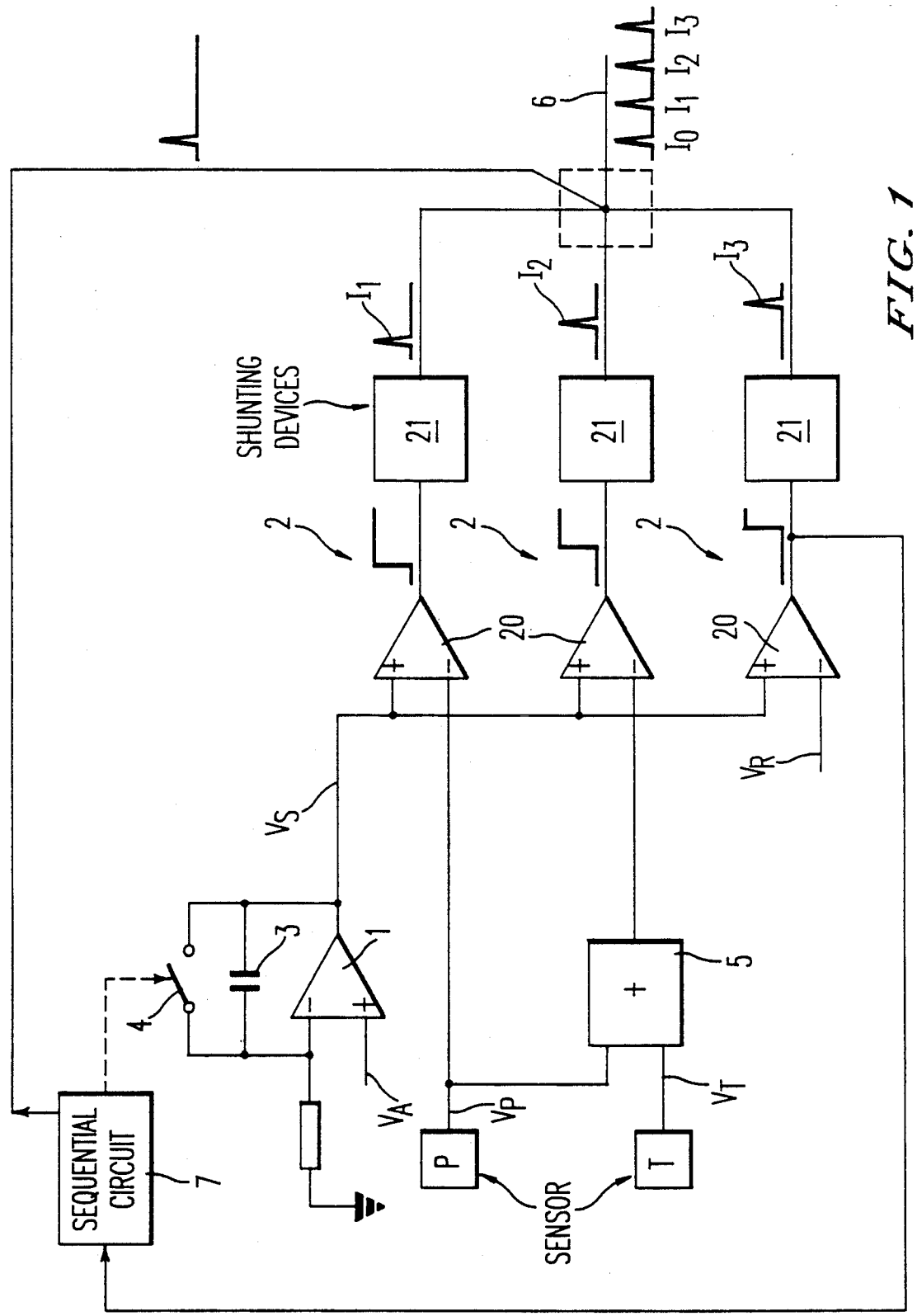
FIG. 1 illustrates an analog embodiment.
Figure 2:
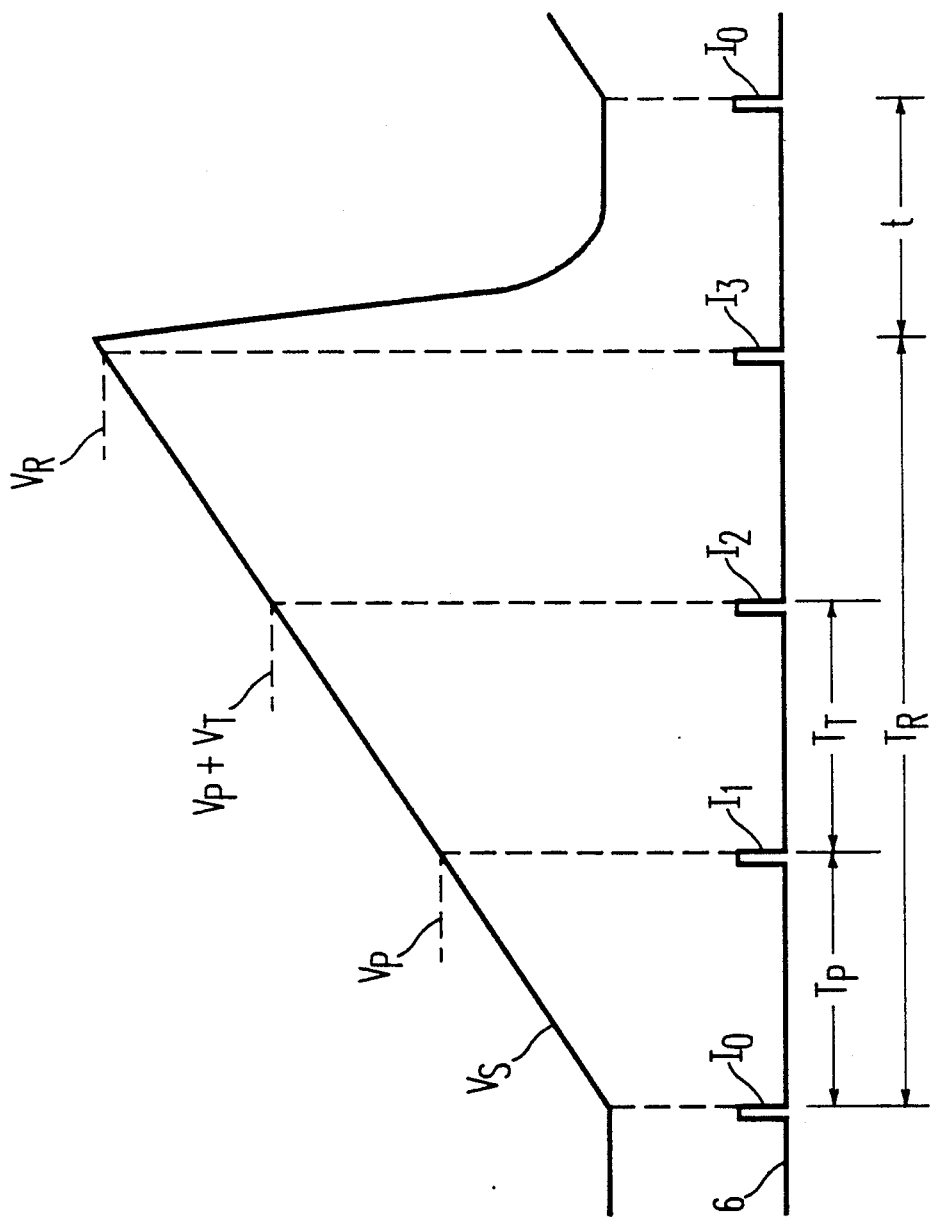
FIG. 2 consolidates the timing diagrams of the main signals.

FIG. 1 diagrams an analog circuit embodying the invention for the coding of the pressure and the temperature noted in a tire. An operational amplifier 1 mounted as an integrator, connected to three analog coincidence detectors 2, is seen. At the outset of the measuring cycle, capacitor 3 is discharged (diagrammed by circuit breaker 4). Integrator 1 delivers a signal $V_s$ in the form of an increasing ramp that is seen in FIG. 2.

The means sensitive to pressure P deliver a voltage $V_P$ as a function of the latter. This voltage is applied to the second input of first coincidence detector 2 and, simultaneously, to analog summation device 5. The means sensitive to temperature T deliver a voltage $V_t$ as a function of the latter, which is applied to summation device 5. In FIG. 2, voltage levels $V_P$ and $V_P+V_T$, as well as reference voltage $V_R$, are seen. It is easily understood that, thanks to three coincidence detectors 2, it is very easy to send pulses $I_1$, $I_2$, $I_3$ corresponding to the intersection of voltage levels $V_P$, $V_P+V_T$, $V_R$ with ramp $V_S$, to output line 6 of the coding device. It is sufficient for this to use analog comparators 20 and to insert, at the output of each analog comparator 20, a shunting device 21 transforming an echelon as a pulse. In this way, time periods $T_P$, $T_T$, and $T_R$ are obtained corresponding to periods $T_i$ for $i=1$ and $i=2$ and $T_{n+1}$ of the general disclosure above. Moreover, the switching of third coincidence detector 2 actuates, by means of a sequential circuit 7, electronic circuit breaker 4 which discharges capacitor 3. After a certain time t, capacitor 3 being perfectly discharged, sequential circuit 7 sends a pulse $T_O$ on output line 6 at the same time it opens circuit breaker 4, which makes it possible to mark the start of a measuring cycle.

Voltages $V_A$ (at the nonreversing input of operational amplifier 1), $V_p$, $V_T$, and $V_R$ are all proportional to the supply voltage of the circuit. Of course, as already disclosed above, voltages $V_P$ and $V_T$ are, in addition, a function respectively of the measured pressure and temperature. Thus, a fluctuation of the supply voltage influences in the same way each of periods $T_i$ and period $T_{n+1}$, which therefore has no influence on the precision of the measurements.

Figure 3:
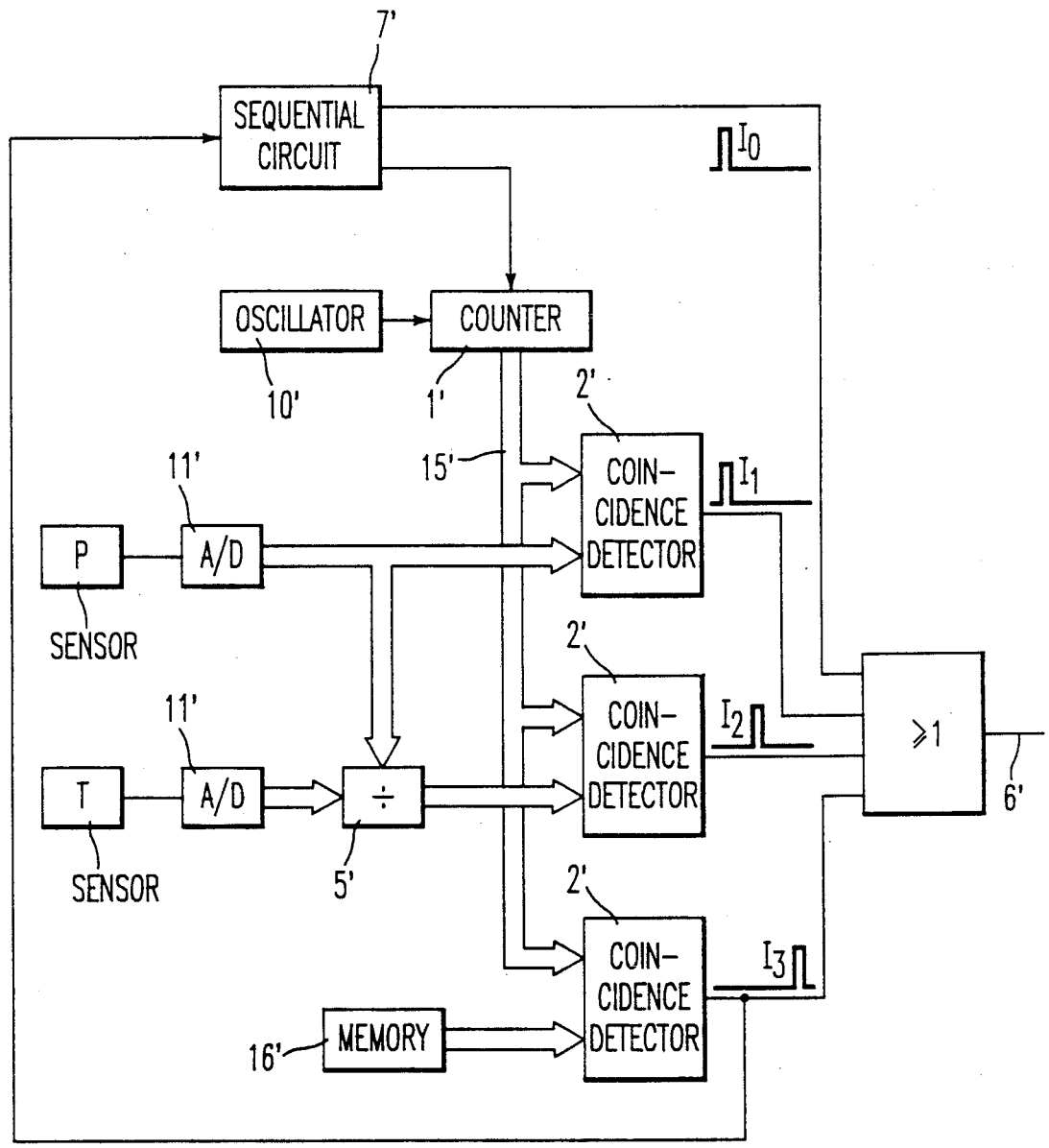
FIG. 3 illustrates a digital embodiment for the same coding principle.

FIG. 3 diagrams a digital embodiment proceeding from the same principle. The ramp here consists of a counter 1' controlled by an oscillator 10'. The outputs of pressure sensor P and temperature probe T are applied to analog/digital converters 11'. The value of counter 1' increases constantly up to a resetting at zero triggered by last coincidence detector 2' via sequential circuit 7' (clearing of the reference value). With resetting to zero finished, same sequential circuit 7' sends a pulse $I_O$ to output line 6'. The instantaneous value of counter 1' is transmitted by a bus 15' to three digital coincidence detectors 2'. On the other hand, and analogously to what was disclosed above, the latter respectively receive the digital value corresponding to the pressure and the sum of the digital values corresponding to the pressure and the temperature, as well as, for the latter, a set reference value recorded in memory 16'. For the rest, the operation is similar. In particular, the processing or decoding of a signal delivered by the two devices is identical.

I claim:
1. Device for coding the value of n quantities measured on a tire, making possible the transmission of said values to the frame carrying said tire, comprising:
   means to mark a start of a measuring cycle by providing an output;
   a generator delivering a reference signal in ramp form, said signal in ramp form being initiated by said output of said means to mark;
   n means each sensitive to one of said quantities, each constantly delivering an output signal as a function of the value of said quantity to which it is sensitive;
   an element delivering a reference value selected in advance to correspond to the end of the measuring cycle;
   n+1 coincidence detectors receiving, at one of their two inputs, said signal in ramp form, and delivering a high signal when the signals at their two inputs are identical, and a low signal at any other time;
   said other input receiving:
   for first coincidence detector, the output signal of one of the means sensitive to said quantities,
   for last coincidence detector, said reference value,
   for remaining n-1 coincidence detectors, an output value of a summation device providing the sum of the value of said other input of the preceding coincidence detector and the output signal of one of n means sensitive to said quantities.
2. Device according to claim 1, wherein said generator essentially consists of an operational amplifier mounted as an integrator,
   wherein said coincidence detectors comprise an analog comparator followed by a shunting device,
   wherein said output signal delivered by the means sensitive to said quantities is an electric voltage,
   and wherein said element delivering a reference value is an element delivering an electric voltage.
3. Device according to claim 1, wherein said generator essentially consists of an oscillator, followed by a counter,
   wherein said coincidence detectors are digital devices,
   wherein said output signal delivered by the means sensitive to said quantities is a digital signal,
   and wherein said element delivering a reference value is a number recorded in a memory.
4. Device according to claim 3, wherein said oscillator essentially consists of a circuit whose period is regulated by the selection of a resistor and a capacitor.

* * * * *

UNITED STATES PATENT AND TRADEMARK OFFICE
CERTIFICATE OF CORRECTION

PATENT NO. : 5,054,315

DATED : October 8, 1991

INVENTOR(S) : ANDRE DOSJOUB

It is certified that error appears in the above-identified patent and that said Letters Patent is hereby corrected as shown below:

Column 1, between lines 5 and 6 insert
--*Field of the Invention*--.

Signed and Sealed this

Thirtieth Day of March, 1993

Attest:

STEPHEN G. KUNIN

*Attesting Officer*     Acting Commissioner of Patents and Trademarks